W. DERICHSWEILER.
PHOTOGRAPHIC EXPOSURE METER.
APPLICATION FILED APR. 14, 1917.
1,377,564.
Patented May 10, 1921.
4 SHEETS—SHEET 2.
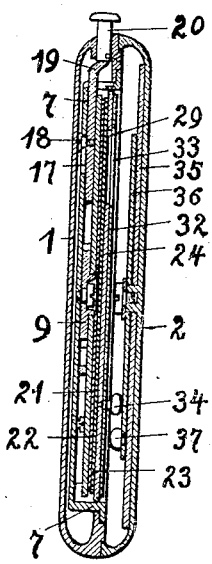
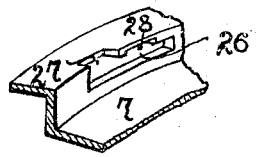
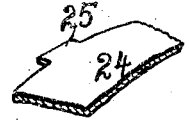
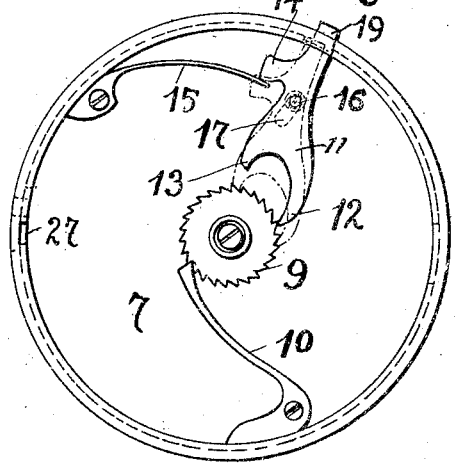
Inventor.
Walram Derichsweiler

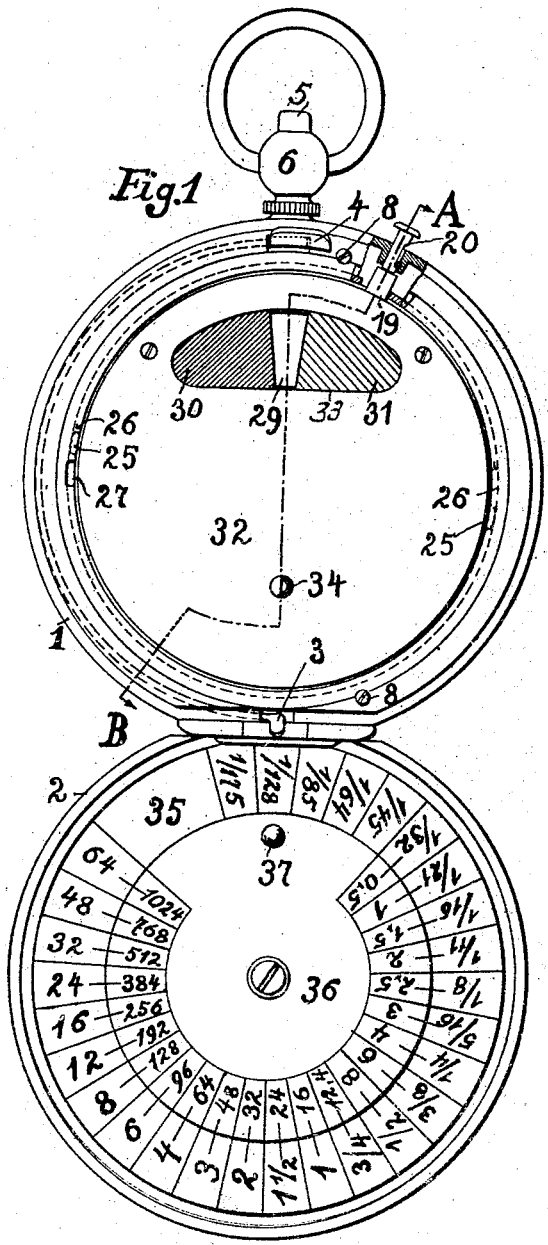

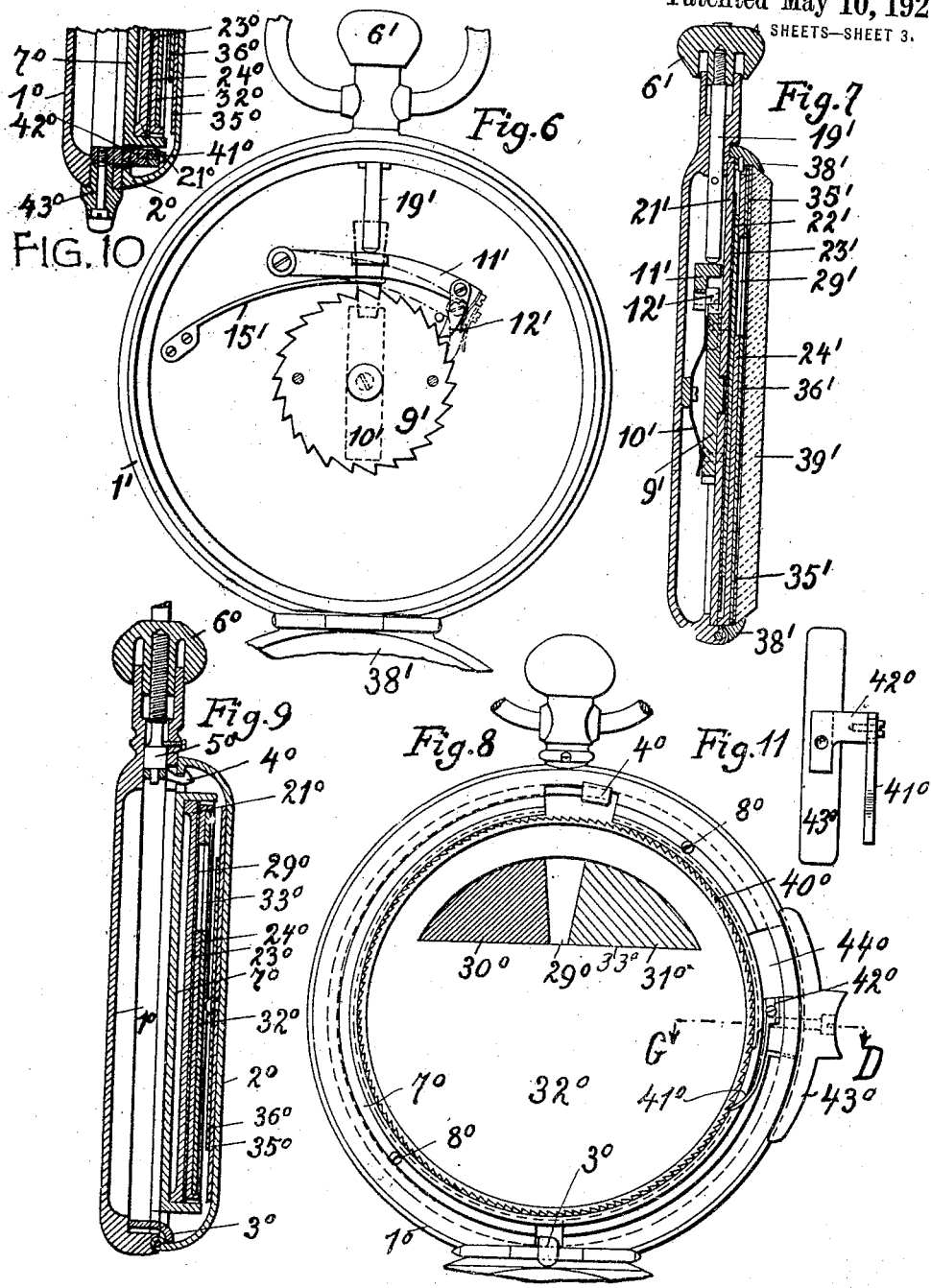

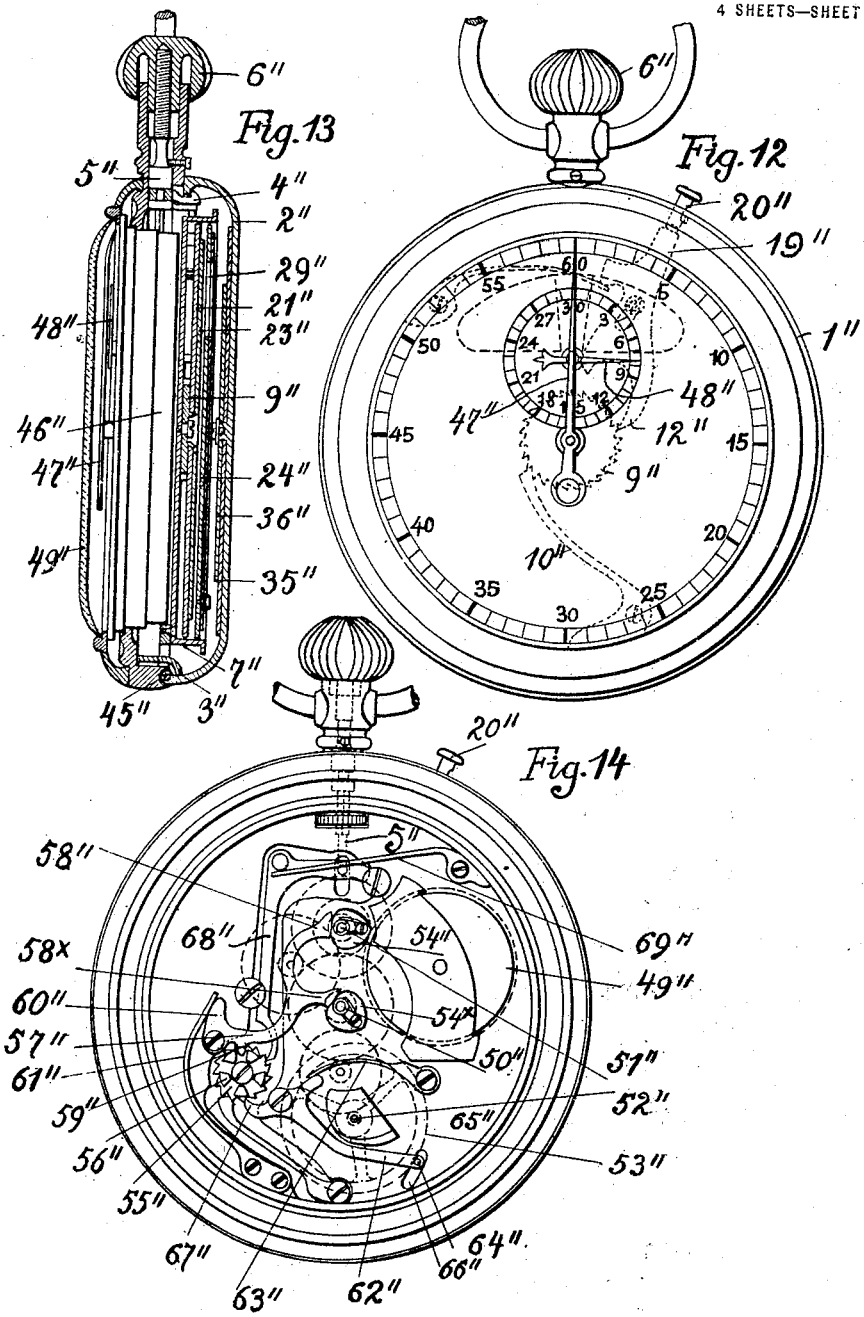

UNITED STATES PATENT OFFICE.

WALRAM DERICHSWEILER, OF ZURICH, SWITZERLAND, ASSIGNOR, BY MESNE ASSIGNMENTS, TO FABRIQUE D'HORLOGERIE RECTA, S. A., OF BIEL, SWITZERLAND, A CORPORATION.

PHOTOGRAPHIC EXPOSURE-METER.

1,377,564.

Specification of Letters Patent.  Patented May 10, 1921.

Application filed April 14, 1917. Serial No. 162,214.

*To all whom it may concern:*

Be it known that I, WALRAM DERICHSWEILER, a citizen of the Republic of Switzerland, and residing at Zurich, Switzerland, have invented certain new and useful Improvements in Photographic Exposure-Meters, of which the following is a specification.

The present invention has reference to improvements in instruments for determining the proper duration of photographic exposures, which operate by first testing the strength of the light by means of a so-called "actinometer" and by then calculating from the scales provided in connection therewith the proper exposure time.

The main object of my invention is to provide an exposure-meter in which fresh portions of the sensitive paper are successively fed forward beneath a transparent portion of an otherwise opaque member and thereby exposed to the action of the light by a feeding mechanism which is controlled by the same hand that holds the instrument. This feature constitutes a great improvement over other actinometer types, whose operation requires the use of both hands, the one holding the instrument and the other adjusting the sensitive paper. A further object of my invention is to provide a combination exposure-meter and stop-watch, in which the paper feeding mechanism is positively coupled with the stop-watch movement, for the purpose of exposing the sensitive paper to the light simultaneously with starting the stop-watch, which makes the operation exceedingly accurate and greatly aids in correctly determining the period of time requisite for a proper exposure.

With these and other objects in view, my invention essentially consists in the construction, arrangement and coöperation of parts, as will now be fully described with reference to the accompanying drawings, in which Figure 1 represents one form of construction of my improved exposure-meter in opened position; Fig. 2 shows a section on line A—B of Fig. 1, with the case cover shut; Fig. 3 shows the mechanism for feeding the sensitized paper; Figs. 4 and 5 show detail parts on an enlarged scale; Fig. 6 represents an elevation of a modification, opened up and with the overlying parts removed to expose the paper advancing mechanism; Fig. 7 is a section through this modified construction, in closed state; Fig. 8 shows still another modification, with certain of the parts broken away, and Fig. 9 shows a section therethrough, with the cover shut; Fig. 10 represents a fragmental section on line C—D of Fig. 8, and Fig. 11 a detail; Fig. 12 shows a further constructional modification, which includes a stop-watch mechanism; Fig. 13 represents a section through this latter modification, and Fig. 14 shows a plan of the stop mechanism of the watch part.

Referring to Figs. 1–5, the shell or case 1 is provided with a cover 2 which is locked in closed position by the spring catch 4, operating in the case rim, engaging behind the cover rim. A pressure spring 3 acts on the cover, and on pressure being applied to the press-pin 5, extending through the crown 6, the spring catch is caused to free the cover, which then flies open under the action of the spring 3, as is well known in the art of watch making in connection with the so-called hunting case watch type.

Within the case 1 is rigidly secured by means of the screws 8 a dish plate 7. Centrally of this latter is rotatably journaled a ratchet wheel 9 with which coöperates a click spring 10. The ratchet member 11, comprising a ratchet tooth 12, a stop tooth 13, a rest 14 for the spring 15, and a push-end 19 extending through the upturned rim of the dish plate (Fig. 3), is slidably arranged on the latter by its pin 16 operating in the dish plate slot 17, an enlarged head 18 to the pin 16 keeping the parts in operative connection. In the rim of the case is operatively secured a press-button 20 (Fig. 1), which contacts with the extension 19 of the member 11.

To the ratchet wheel 9 is fixed a disk 21 serving to support the sheet of sensitive paper 23. This paper carrier 21 is roughened on its face, or a special layer 22 of rough material, for instance emery cloth, is secured thereon, and the sensitive paper is frictionally retained on this roughened surface. Next, a plate 24 is readily removably placed into the dish plate over the paper carrier, and is retained therein by the two tongues 25 coöperating with slots 26 correspondingly provided in the case rim.

One of these slots (Fig. 4) opens into the cut-out 27, near which an upwardly directed recess 28 is provided. The stationary plate 24 is provided with a taper slot or window 29, through which the sensitive paper 23 can be inspected. Flanking this window are the standard comparison tints 30, 31. An opaque disk 32, for instance of celluloid, with a transparent portion or a window 33 is superimposedly fixed on the plate 24, the standard tints and the taper window 29 showing through this aperture 33. A knob 34 on the plate 32 serves to rotate the latter until the bayonet locks 25, 27 become disengaged, when the plate 24 can be lifted out for changing the sensitive paper. Normally one of the tongues 25 engages in the recess 28 of the dish plate and prevents thereby an accidental back-movement of the plate 24.

In the case cover 2 is fixed a circular calculating scale 35, and rotatable and readily exchangeable a smaller scale 36, the latter provided with a knob 37 for operation on the scale 35.

To recapitulate briefly: 23 indicates the sensitized paper, 21 the paper carrier, 24 a removable plate with a taper window 29 and the standard tints 30, 31, and 32 an opaque member having a translucent portion or window 33.

By pressing the button 20, the ratchet member 11 is moved into the broken-line position of Fig. 3, the tooth 12 advancing the ratchet wheel 9 a predetermined distance, and the tooth 13 finally acting to limit this feed movement, so that the ratchet wheel for each operation is always advanced through the same angle. The paper carrier 21, 22 and the paper, obviously, partake of this rotary movement, which can be obtained with the cover 2 in closed position, so that pre-exposure is excluded, and the push-button 20 can readily be operated by a finger of the hand holding the instrument, even with the latter still in the operator's pocket.

In the modification according to Figs. 6 and 7, the ratchet wheel 9' is secured to the rear of the paper carrier 21' fitted in the case 1'. A spring influenced pawl 12', pivoted to the rocking lever 11', coöperates with this ratchet, and a spring 15' acts on the rocking lever 11' in an upward direction. To the crown 6' is fixed the push-pin 19' which acts on the rocking lever 11'. A stop spring 10' prevents backward rotation of the ratchet wheel. The paper carrier 21' is preferably provided with a roughened layer 22' and supports the sensitive paper 23'. The plate 24' is stationary and is provided with a window 29'. Hinged to the case 1' is the cover annulus 38', within which is rotatably retained the crystal 39'. The one calculating scale 36' is affixed to the opaque, windowed plate 24', and the other scale 35' in annular shape to the inside of the watch crystal, and for making a calculation the crystal is rotated in the one or the other direction, as well known in this art. A finger-pressure on the crown 6' suffices to displace the sensitive paper relative to the plate 24' for moving a fresh portion of the paper beneath the window 29'.

In the modification illustrated by the Figs. 8–11, the lid 2° is hinged to the case 1° and is acted on by the spring 3° and catch mechanism 4°, 5° 6° in well known manner. The dish plate 7° is stationary within the case, and it can be so fitted that it lies close to the inner rear face of the case 1°, if a very thin or flat model is desired. Within the dish plate 7° is stationarily secured the circular paper carrier 21° supporting the sensitive paper 23°, upon which latter is removably superimposed the plate 24° with the window 29°. The standard tints 30° and 31° are provided on the opaque disk 32° and flank the window 33° of this latter. 35° and 36° are the calculating scales.

The plate 24° is circumferentially provided with teeth 40° with which coöperates a pawl 41° extending from the intermediate member 42° secured to the external slide member 43°. By reciprocating these parts in the case slot 44° the plate 24° is displaced relative to the sensitive paper 23° for bringing a fresh portion of the paper beneath the windows 29° and 33°. The usual brake or stop spring may be used for preventing backward rotation of the plate 24°, or the latter may be so dimensioned that it is frictionally braked on the dish plate 7°.

In the Figs. 12–14 there is shown a novel combination exposure-meter and stop watch. The construction and operation of the stop watch as such offer nothing new and need not specially be described here, but the timed coöperation of the means for setting in motion the watch works and for stopping it again, and of the means for simultaneously exposing the sensitive paper, now to be described, are new.

The watch case 45″ contains the train of gears and other parts making up the works 46″, which, as is customary in stop watches, is provided with a central second-hand 47″ and a minute-hand 48″. The spring barrel 49″ drives the second-arbor 50″, the minute-arbor 51″, and the arbor 52″ of the balance 53″ in well known manner by the aid of suitable intermediate members. The arbors 51″ and 50″ friction-tightly support the heart-shaped cam disks 54″ and 54ˣ respectively The ratchet wheel 55″ is provided on one side face with cams 56″. The vibrating lever 57″ has two paws 58″ and 58ˣ, which under the influence of the spring 61″ normally bear against the flattened base portion of the respective heart cams 54″, 54ˣ, when the lever nose 59″ drops in between two of the cams 56″; the hands 47″ and 48″ then assume the "zero" position. The rocking lever 62″ is influenced by the spring 63″ and controls by a stop pin 64″, laterally extending through a slot 66″ in the plate 65″, the balance 53″, and thus arrests the works when its nose 67″ rests on one of the cams 56″, as shown in Fig. 14. The ratchet wheel 55″ is stepped ahead by the lever 68″, which is acted on by the push-pin 5″ of the crown 6″ in the one sense, and by the spring 69″ in the other sense. To the push-pin is rigidly connected the catch 4″ (Fig. 13) for keeping the cover 2″ locked on the case.

In the rear of the watch works is secured the dish plate 7″ and the rest of the parts making up the exposure-meter proper, as described in detail with reference to Figs. 1–5.

If the stop mechanism parts are in the position shown in Fig. 14 with the lid 2″ shut, finger pressure on the push-button 20″ will cause a fresh portion of the sensitive paper to be fed beneath the window 29″. Pressure on the crown 6″ then causes the cover 2″ to fly open and thereby admit the light to the window 29″, and simultaneously the watch movement is started in the following manner: The pin 5″ forces the lever 68″ downwardly, which advances the ratchet wheel 55″ to a corresponding degree. The nose 59″ of the lever 57″ climbs a cam 56″, which causes the paws 58″, 58ˣ to be respectively lifted off the heart cams 54″, 54ˣ. At the same time the nose 67″ drops off its cam 56″ in between the latter and the succeeding cam, which causes the lever 62″ to rock and to thereby free the balance 53″, when the movement is set going.

On the exposed sensitive paper having assumed the shade of one of the standard tints, the crown 6″ is depressed again, which causes the ratchet wheel to advance; the nose 67″ climbs a cam 56″, and the lever pin end 64″ arrests the balance. The nose 59″, however, still remains on its cam 56″ and the paws 58″, 58ˣ are thereby kept out of contact with the heart cams, with the result that the hands 47″, 48″ remain in the stopped position, so that the operator can readily ascertain how many seconds, or minutes and seconds, were consumed in tinting the sensitive paper to the required shade. The indicated time is then used to set the calculating scales in the well known manner, for ascertaining the time requisite for making the exposure on the dry plate or film.

Closing of the cover 2″ causes the catch 4″ and with it the push-pin 5″ to be depressed with the effect that the ratchet wheel 55″ is fed forward again a certain distance by the lever 68″. The nose 67″, this time, remains on its cam 56″, and the balance remains locked, but the nose 59″ drops into the space between two cams, which causes the lever 57″ to rock under the action of the spring 61″ and to press its paws 58″, 58ˣ against the respective heart cams. The latter and their respective hands are then forced back into the zero position, shown in Fig. 14. This adjustment to zero, however, can also be brought about by a further pressure on the crown 6″.

What I claim as new is:—

1. In a photographic exposure-meter including sensitive paper, a member for protecting said paper against the action of light and having a transparent portion, and a mechanism adapted to effect a relative displacement between said paper and said protecting member, and to positively limit such displacement to a definitely limited angle.

2. In a photographic exposure-meter including sensitive paper, a member for protecting said paper against the action of light and having a transparent portion, and mechanism adapted to displace said sensitive paper relatively to said transparent portion, and to positively limit such displacement to a definitely limited angle.

3. In a photographic exposure-meter including sensitive paper, a member having a window and protecting said sensitive paper against the action of light, and a ratchet mechanism for stepwise, equidistantly and equidirectionally displacing said sensitive paper relatively to said window.

4. In a photographic exposure-meter including sensitive paper, a windowed opaque member over said sensitive paper, and a mechanism for relatively displacing said paper to said windowed member, and to positively limit such displacement to a definitely limited angle.

5. In a photographic exposure-meter, a case, a paper carrier, sensitive paper on said carrier, a windowed opaque member covering said sensitive paper, and mechanism adapted to displace said paper carrier relatively to said windowed member and to positively limit such displacement to a fixed angle and to be actuated from without said case.

6. In a photographic exposure-meter, a case, a paper carrier, sensitive paper on said carrier, a windowed opaque member over said paper, said paper carrier being adapted to be displaced relatively to said windowed member and a ratchet mechanism at one end operatively connected to said displaceable member and with the other end extending outwardly through said case.

7. In a photographic exposure-meter, a case, a spring cover thereto, a paper carrier, sensitive paper on said carrier, a windowed opaque member, and a ratchet mechanism for displacing said paper carrier relatively to said windowed member.

8. In a photographic exposure-meter, a case, a spring cover thereto, a paper carrier, sensitive paper on said carrier, a non-displaceable opaque member having a window facing said spring cover, circumferential teeth on said paper carrier, and a feeding mechanism for said paper carrier, comprising a finger-pressure influenced member coöperating with one end with said paper carrier teeth and with the other end extending through said case.

9. In a photographic exposure-meter including sensitive paper, a case, a windowed cover member for said sensitive paper, an opaque member normally covering the window in said cover member, a stop-watch movement mechanism in said case, means for starting said stop-watch movement and means for displacing said opaque member from said window, both said means coactingly interconnected.

10. In a photographic exposure-meter including sensitive paper, a case, a spring actuated catch cover thereon, a windowed opaque member covering said sensitive paper, a stop-watch movement including a balance, means for controlling said balance and means for releasing and locking said case cover, both said means coactingly interconnected, and said sensitive paper and said windowed member relatively displaceable.

11. In a photographic exposure-meter including sensitive paper, a case, a spring actuated cover to said case, a stop-watch movement in said case, an opaque, stationary plate having a window, a paper carrier, a ratchet mechanism actuated by finger-pressure and operating said paper carrier, a stop mechanism for said movement, a stem extending through said case actuated by finger-pressure and in turn controlling said stop mechanism, and means also actuated by said press-stem for releasing said case cover.

12. In a photographic exposure-meter including sensitive paper, a case, a spring actuated cover to said case, a stop-watch movement, means for simultaneously opening said cover and setting said movement going, and means for mechanically successively exposing fresh portions of said sensitive paper, substantially as set forth.

In testimony whereof I affix my signature.

WALRAM DERICHSWEILER.